US009704253B2

(12) United States Patent
Lange et al.

(10) Patent No.: US 9,704,253 B2
(45) Date of Patent: Jul. 11, 2017

(54) METHOD FOR DETERMINING DEPTH MAPS FROM STEREO IMAGES WITH IMPROVED DEPTH RESOLUTION IN A RANGE

(71) Applicant: Conti Temic microelectronic GmbH, Nuremberg (DE)

(72) Inventors: Frederik Lange, Nuremberg (DE); Robert Stueck, Lindau (DE); Christian Exner, Bodolz (DE); Alexander Bachmann, Lindau (DE); Gregory Baratoff, Wangen (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 6 days.

(21) Appl. No.: 14/655,149

(22) PCT Filed: Jan. 14, 2014

(86) PCT No.: PCT/DE2014/200001
§ 371 (c)(1),
(2) Date: Jun. 24, 2015

(87) PCT Pub. No.: WO2014/108130
PCT Pub. Date: Jul. 17, 2014

(65) Prior Publication Data
US 2015/0332467 A1 Nov. 19, 2015

(30) Foreign Application Priority Data

Jan. 14, 2013 (DE) ........................ 10 2013 100 344

(51) Int. Cl.
*G06T 7/00* (2006.01)
*G06K 9/52* (2006.01)
(Continued)

(52) U.S. Cl.
CPC .............. *G06T 7/0075* (2013.01); *G06K 9/52* (2013.01); *G06K 9/6215* (2013.01); *G06T 7/593* (2017.01);
(Continued)

(58) Field of Classification Search
CPC ...... G06T 7/0075; G06K 9/6215; G06K 9/52; H04N 13/0271; H04N 2013/0081
(Continued)

(56) References Cited

U.S. PATENT DOCUMENTS 5,179,441 A * 1/1993 Anderson ................ G06K 9/32
348/43
6,314,211 B1 * 11/2001 Kim .......................... G06K 9/20
348/42

(Continued)

FOREIGN PATENT DOCUMENTS

DE      103 10 849      9/2004
DE     102008015535      8/2008
(Continued)

OTHER PUBLICATIONS

International Search Report of the International Searching Authority for International Application PCT/DE2014/200001, mailed Jul. 2, 2014, 3 pages, European Patent Office, HV Rijswijk, Netherlands.
(Continued)

*Primary Examiner* — Amandeep Saini
(74) *Attorney, Agent, or Firm* — W. F. Fasse (57) ABSTRACT

In a method for determining a depth map from stereo images, the disparity for a pixel is determined from a discrete quantity of predefined disparity values that are distributed over the entire predefined disparity value range. The distribution has at least two different distances between different pairs of adjacent disparity values. In this method, it is possible that only those disparities for which a more
(Continued)

precise determination is required, will be more precisely calculated.

22 Claims, 4 Drawing Sheets

(51) Int. Cl.
    *G06K 9/62*     (2006.01)
    *H04N 13/02*     (2006.01)
    *G06T 7/593*     (2017.01)
    *H04N 13/00*     (2006.01)

(52) U.S. Cl.
    CPC . *H04N 13/0271* (2013.01); *H04N 2013/0081* (2013.01)

(58) Field of Classification Search
    USPC .......................................................... 382/190
    See application file for complete search history.

(56) References Cited

U.S. PATENT DOCUMENTS

| | | | |
|---|---|---|---|
| 2009/0316994 A1* | 12/2009 | Boughorbel | G06T 7/0075 382/195 |
| 2012/0002866 A1 | 1/2012 | Hirschmueller et al. | |
| 2013/0215234 A1* | 8/2013 | Lim | G06T 7/0075 348/47 |
| 2013/0259360 A1* | 10/2013 | Bingrong | G06T 7/0065 382/154 |

FOREIGN PATENT DOCUMENTS

| | | |
|---|---|---|
| DE | 102007027958 | 12/2008 |
| DE | 102008046505 | 3/2010 |
| DE | 102012206329 | 5/2013 |
| DE | 102014017196 | 5/2016 |

OTHER PUBLICATIONS

PCT International Preliminary Report on Patentability including English Translation of PCT Written Opinion of the International Searching Authority for International Application PCT/DE2014/200001, issued Jul. 14, 2015, 8 pages, International Bureau of WIPO, Geneva, Switzerland.

German Search Report for German Patent Application No. 10 2013 100 344.3, dated Oct. 25, 2013, 6 pages, Muenchen, Germany, with English translation, 5 pages.

Stefan K. Gehrig et al., "Improving Stereo Sub-Pixel Accuracy for Long Range Stereo", IEEE 11$^{th}$ International Conference on Computer Vision, Oct. 14-21, 2007, Rio de Janeiro, XP031194701, pp. 1 to 7.

Pascal Steingrube et al., "Performance Evaluation of Stereo Algorithms for Automotive Applications", Computer Visions Systems, Oct. 13, 2009, Springer Verlag publisher, Berlin, Heidelberg, XP019131958, pp. 285 to 294.

Ingo Feldmann et al., "Navigation Dependent Nonlinear Depth Scaling", 23rd Picture Coding Symposium, Apr. 23-25, 2003, Saint Malo, XP030080071.

I. Feldmann et al., "Nonlinear Depth Scaling for Immersive Video Applications", Digital Media Processing for Mulitmedia Interactive Services, Proceedings of the 4$^{th}$ European Workshop on Image Analysis for Multimedia Interactive Services, Queen Mary, University of London, Apr. 9, 2003, XP002581663, pp. 1 to 6.

Stefan K. Gehrig et al., "Real-Time Semi-Global Matching on the CPU", IEEE Computer Society Conference on Computer Vision and Pattern Recognition Workshops, Jun. 13-18, 2010, San Francisco, CA, USA, pp. 85 to 92.

Heiko Hirschmueller, "Accurate and Efficient Stereo Processing by Semi-Global Matching and Mutual Information", Proceedings of the IEEE Conference on Computer Vision and Pattern Recognition, Jun. 20-26, 2005, San Diego, CA, USA, vol. 2, pp. 807 to 814.

Young-Chul Lim et al., "Distance Estimation Algorithm for Both Long and Short Ranges Based on Stereo Vision System", IEEE Intelligent Vehicles Symposium, Jun. 4-6, 2008, Eindhoven, The Netherlands, pp. 841 to 846.

Cosmin D. Pantilie, "SORT-SGM: Subpixel Optimized Real-Time Semiglobal Matching for Intelligent Vehicles", IEEE Transactions on Vehicular Technology, vol. 61, No. 3, Mar. 2012, pp. 1032 to 1041.

René Ranftl et al., "Pushing the Limits of Stereo Using Variational Stereo Estimation", IEEE Intelligent Vehicles Symposium, Jun. 3-7, 2012, Alcalá de Henares, Spain, pp. 401 to 407.

Stefan K. Gehrig et al., "A Flexible High-Resolution Real-Time Low-Power Stereo Vision Engine", Computer Vision Systems, vol. 9163 of the series Lecture Notes in Computer Science, ICVS Jun. 19, 2015, pp. 69 to 79. http://link.springer.com/chapter/10.1007/978-3-319-20904-3_7?no-access=true.

* cited by examiner

METHOD FOR DETERMINING DEPTH MAPS FROM STEREO IMAGES WITH IMPROVED DEPTH RESOLUTION IN A RANGE

FIELD OF THE INVENTION

The invention relates to a method for determining a depth map from stereo images.

BACKGROUND INFORMATION

In driver assistance systems with a stereo camera the stereo images are used for calculating a depth image. A depth image is very helpful for many functions of a driver assistance system, including the collision avoidance, the following of other vehicles, etc.

For determining a depth map from stereo images different correlation methods can be used. These algorithms differ in quality and density of the calculated depth map. In addition, the required computing power and the required main memory vary for the calculations.

Basically, the following classes of correlation methods exist:
1. Local correlation methods
2. Global or semi-global methods with specified disparities/labels (discrete optimization methods)
3. Global methods with continuous disparities (continuous optimization methods, e.g. convex optimization).

The advantages and disadvantages of the various groups and methods are not further discussed here.

A disparity means the distance or shift of identical image objects between left and right stereo image.

In a calibrated stereo camera (what can be assumed in the following) only the horizontal distances are to be considered, i.e. the distances in a line.

For practical applications the algorithms from the second group have proved to be particularly suitable. Especially SGM (Semi Global Matching) is regarded as the most functional algorithm for use in real-time systems.

It provides both a high quality of the depth map as well as compared to most other algorithms a low demand of computing power and main memory. On an FPGA (Field Programmable Gate Array) of the latest available driver assistance camera it runs in real time with approximately 16 FPS (frames per second, i.e. images/second). A calculation in real time on a signal processor is not feasible in the foreseeable future.

In fact, for the use of SGM there is currently no alternative which would not involve significant disadvantages. SGM is state of the art and is widely in use.

In the algorithms of the second category and in particular SGM the disparities are determined as integer shifts of the pixels in the image. For this in a first step a comparison operator is used per pixel and disparity. In practice and according to the state of the art, the census operator has proved to be a particularly robust comparison operator.

For this discussion, it is assumed that the right image is the reference frame and (x,y) is an image coordinate. For each pixel $P\_r$ (x,y) in the right image the census operator is determined. In the left image the census operator for the pixel $P\_l$(x+d,y) with d=0, . . . , d_max is determined and compared with the census from the right image. This therefore results in a cost measure C (x,y,d) per pixel and disparity. For the entire image, this results in a three dimensional space, which is called cost volume. Based on this cost volume SGM performs an optimization, which determines a disparity per pixel as a result. In doing so, SGM determines by means of an interpolation of the internal costs, which are present for integer and uniformly distributed disparities, a sub-pixel precise disparity in addition to the integer disparity values.

The disparity does not directly indicate the distance z of the next object to the camera (z=0). The connection is reciprocal:

$$z=C1*1/(d+C2) \quad (1)$$

wherein C1 and C2 are constants. In a calibrated stereo camera C2=0 applies.

C1=f*b depends in a calibrated camera on the following parameters:
f focal length in pixels
b base width The accuracy of depth measurement is, therefore, dependent on the depth. In close range a higher accuracy is achieved than in far range. Given a maximum disparity d_max also the minimum determinable distance z_min depends on C1.

From the requirements of a camera system z_min is predefined. A minimal determinable distance must be able to be achieved.

In practice, the accuracy in far range has turned out to be as particularly critical. The accuracy in close range is more than adequate for use in driver assistance systems.

According to the state of art there are several techniques to increase the accuracy. They are shown with their advantages and disadvantages in the following:
1. Interpolation of the Costs For each pixel the disparity defined by SGM is selected. This disparity is refined while considering the cost of the adjacent disparities. This can be done by a quadratic interpolation with minima-search of the three disparities. Other interpolation schemes (equi-angular fit) are also possible. Details are described in Heiko Hirschmüller, Accurate and Efficient Stereo Processing by Semi-Global Matching and Mutual Information, in Proceedings of the IEEE Conference on Computer Vision and Pattern Recognition, 20-26 Jun. 2005, San Diego, Calif., United States, Volume 2, pp. 807-814, improvements can be found e.g. in Stefan K. Gehrig, Uwe Franke, Improving Stereo Sub-Pixel Accuracy for Long-Range Stereo ICCV of 2007.

The advantage of this method is the simple and resource-efficient implementation. However, the disadvantage is that this method often cannot significantly improve the results. One of the main reasons is the effect of the "pixel-locking", an artifact formation in the sub-pixel interpolation of objects, which are represented by a relatively small number of pixels in the image. Due to the pixel-locking certain interpolated positions (such as e.g. centers or edge points of the pixels) are over-represented.

2. Finer Sampling of the Disparities

In Stefan K. Gehrig, Uwe Franke, Improving Stereo Sub-Pixel Accuracy for Long-Range Stereo ICCV 2007 it is also described that by a finer sampling of the disparities the accuracy of the depth map can be significantly improved.

The cost volume is here resolved finer in the dimension d of the disparity, intermediate steps with 0.5 or 0.25 disparities are inserted. The costs of the intermediate steps are interpolated in the example of the adjacent costs. As a result the cost volume thus contains 2 or 4 times more disparities.

The disadvantage of the finer sampling is that the need for resources, i.e. computing power, storage and memory bandwidth, increases linearly with the number of the disparities.

3. Sub-Pixel Refinement

Starting from an original disparity map the disparities can be refined locally. For this, local correlation methods are used on the two images.

These methods, however, work only in image ranges with a high contrast, i.e. at edges, etc. In practice, it is, therefore, unrealistic to densely refine a disparity map with such methods.

4. Hierarchical Refinement Scheme

In Stefan K. Gehrig, Clemens Rabe, Real-time Semi-Global Matching on the CPU, CVPR 2010 a method is described, in which the disparities in close range are determined with a lower resolution than in far range.

However, this does not apply only for the disparities, but also for the xy-resolution of the pixels. Smaller objects in close range can possibly not be recognized in this way.

In DE 103 10 849 A1 a method for photogrammetric distance and/or position determination is shown, which implements a hierarchical measurement range adjustment. Here, from an original reference and search-gray-scale image pair p new pairs with an increasingly reduced resolution are produced.

In all resolution steps now similarity measures for reference image blocks with equal size search image blocks are determined, the search image blocks being shifted in the respective search gray-scale image pair each in the line direction with a step size of one pixel. The disparity for a reference block is determined by searching sequences of similarity measures for this reference block with regard to extreme values, wherein for all resolution steps except the original resolution step an area each at the beginning of the sequence of similarity measures, which was already detected in the preceding resolution step, is excluded from the search. From the location of the identified extreme value the position of the corresponding object point is determined in a conventional manner.

The disadvantage with this local method is the high expenditure when generating the p image pairs with reduced resolution and the high iteration need for disparity determination.

5. Calculation of Overview and Magnifier Map

In DE 10 2008 015 535 A1 it is described that an overview map and a magnifier card can be calculated separately. The overview map works here at the half resolution over the entire image range and the magnifier card in the full resolution, however, only in a variable section of the image.

The disadvantages of the method are that the magnifier map is not present for the entire image and that the expenditure of resources is doubled by calculating the magnifier map or that in two separate steps first the entire image is calculated with a reduced resolution and then the magnifier map with an increased resolution.

SUMMARY OF THE INVENTION

It is an object of at least one embodiment of the present invention to provide a method for determining a depth map from stereo images, which over a wide distance range has a better resolution without having to accept the disadvantages of the methods known from prior art.

A starting point for the method according to the invention is the method described in section 2, wherein, however, its disadvantages regarding the resources shall be avoided. As described in the beginning, the accuracy problems exist only in one single range, e.g. in the far range.

A basic idea of the invention is not to sample all disparities in a finer way, but only for those ranges, in which the accuracy is to be increased.

An alternative basic idea of the invention is to produce a reference image and a search image from a stereo image pair, the resolution (especially horizontal) of the reference image being reduced by an integer factor k compared to that of the search image. This allows for a disparity determination with an accuracy of 1/k (pixels) by means of a comparison/similarity operator directly without interpolation.

A method according to an embodiment of the invention for determining a depth map from stereo images provides that the disparity is determined from a discrete quantity of predefined disparity values. The predefined disparity values are distributed over the entire predefined disparity value range and this distribution has at least two different distances between different pairs of adjacent disparity values. Disparity here means the shift of identical image objects between the left and right stereo images. An advantage of a calibrated stereo camera is that only the shift in a line is to be taken into account. The disparity is preferably determined pixel by pixel (i.e. referred to a pixel of the original image, e.g. of the right stereo image). The value of the determined disparity can be an integer pixel value, but preferably the quantity of predefined disparity values contains also sub-pixel values, such as e.g. shifts by a half or quarter pixel.

In other words, the method according to an embodiment of the invention can be described as follows: disparities are determined from at least one stereo image pair, the predefined potential (discrete) disparity values being not uniformly distributed over the entire disparity value range.

The advantage of the method according to the invention is seen in that the gradation of the disparity values and thus the depth resolution can be adapted to the distance range.

In an advantageous form of embodiment the distances or intervals between two adjacent disparity values, in which disparities are determined for a far range, are smaller than the other distances between two adjacent disparity values. In the far range the shifts or disparities are small, what limits the depth resolution. By a finer distribution of the given shift values, particularly in the sub-pixel range, in the far range here the depth resolution can specifically be improved.

This is particularly advantageous for an application of the method in stereo camera based driver assistance systems, as here a higher resolution is needed in the far range to better spatially dissolve more distant objects.

In order to keep the number of disparities to be calculated as a whole equal and without increasing the minimum predictable close-up limit, sampling in the close range can be reduced advantageously for this purpose. Distances or intervals between two adjacent disparity values, in which disparities for a close range are determined, thus can be larger than the other distances between two adjacent disparity values (by predefining the discrete disparity values accordingly distributed).

A far range can in particular be at least 10 meters away from the stereo camera, with which the stereo images are recorded. A close range can in particular be a maximum of 5 meters away from the stereo camera.

Advantageously, at least one interval or distance between two adjacent disparity values can have a length below a pixel (sub-pixel).

Preferably, comparison/similarity costs for a disparity in the stereo image pair are determined by a suitable comparison operator, advantageously by the census operator. The disparity value for a pixel can then be determined as that with the lowest comparison/similarity costs.

Preferably, comparison/similarity costs for sub-pixel disparities are determined from the comparison/similarity costs of the adjacent integer disparities by interpolation and the comparison/similarity costs of the integer disparities are determined by an appropriate comparison operator from the stereo image pair.

Advantageously, when specifying the distances or intervals within the predefined quantity of disparity values, effects caused by over- or subsampling are taken into account.

In a preferred form of embodiment, the disparities are determined by means of a global or semi-global matching or a correspondence method.

Preferably, for determining of all disparities of the depth map of a stereo image or of all stereo images always the same (non-uniform) disparity value distribution is used.

In an advantageous form of embodiment, a reference image and a search image are produced from a stereo image pair, the resolution (especially horizontal) of the reference image being reduced by an integer factor k compared to that of the search image. Disparity values are determined with an accuracy of l/k pixels on the basis of the reference and the search image.

The invention further comprises an apparatus comprising a stereo camera for recording and a determination unit, the determination unit being designed in accordance with the method according to the invention for evaluating stereo images recorded with the stereo camera.

In principle, the disparities for a pixel in the cost volume correspond to a set of possible labels for a pixel. SGM calculates the allocation of the labels to the pixels. For each label the costs for allocating the labels for the pixel are determined. At the end the label with the lowest costs is selected.

In SGM and all known methods, which use fixed labels for the disparities, the labels are uniformly distributed over the disparity.

A continuous value, namely the disparity is thus classified into uniform intervals predefined by the labels.

By the method according to the invention the intervals over the disparity are no longer uniform. The intervals of the labels (or distances between two adjacent disparity values) can be freely selected in principle.

Effects caused by sub- or oversampling can be taken into account in the selection of the intervals. Alternatively, the original images can also be filtered accordingly. This is particularly important during sub-sampling.

As described in Stefan K. Gehrig, Uwe Franke, Improving Stereo Sub-Pixel Accuracy for Long Range Stereo ICCV 2007 the costs for the disparities can be interpolated from the costs of the adjacent disparities. In particular, by fitting a parabola by value-based adjacent costs and calculation of the minimum value of the costs a sub-pixel precise determination of the disparities can be achieved. Alternatively, they can also be determined directly in the image. It is advantageous here, when the disparities and thus the costs are determined only for integer pixel indices. Also combinations of both methods for determining the costs for the disparities are conceivable.

Adjustments in regularization can be made where appropriate. In SGM the (adaptive) penalty terms P1 (delta_d=1) and P2 (delta_d>1) are used as regularization for the disparity leaps (see formula (11) in Heiko Hirschmüller, Accurate and Efficient Stereo Processing by Semi-Global Matching and Mutual Information, in Proceedings of the IEEE Conference on Computer Vision and Pattern Recognition, 20-26 Jun. 2005, San Diego, Calif., United States, Volume 2, pp. 807-814). It may be advantageous to adapt these to the sampling intervals or to supplement them by further penalty terms.

Examples of embodiments of the invention and the resulting advantages are exemplified in the following and illustrated by figures. For this, the accuracy of the results between a uniform distribution of the disparities and a non-uniform distribution according to the invention is compared.

The following assumptions are made:
Resolution of the disparity map: 512*256 pixels
Resolution of the image: 1024*512, 512*256
Number of disparities (label): 64 (0 . . . 63)
Base width b: 12 cm
Focal length f: 1145
Comparison operator: census (window size x=9, y=7)
Uniform Sampling:

Each disparity corresponds here to a shift of one pixel in the image. The images are used with 512 pixels per line. This image is produced from the original image with a resolution of 1024 pixels per line by filtering with subsequent sub-sampling.

Non-Uniform Sampling:

The resolution of the disparity (or the distance between two adjacent disparity values) is determined according to the following intervals (or disparity value ranges):

| Intervals in pixel | Resolution of the disparity (referred to a resolution of 512 pixels per line) |
|---|---|
| 0-10.5 | 0.5 |
| 10.5-31.5 | 1 |
| 31.5-63 | 1.5 |

The right reference image is used like for the uniform sampling.

The left image is used with 1024 pixels per line. This image is produced from the original image with a resolution of 1024 pixels per line by filtering. Only every second line is calculated.

Because of the double resolution per line in the left image the census operator can be determined also directly without interpolation for disparities of 0.5, 1.5, etc. This was considered in the selection of the intervals and the resolution of the disparity. The maximum disparity is also here predefined as 63 by the intervals or distances between adjacent disparity values in the different disparity value ranges. Thus, the same distance range can be displayed.

After having calculated the disparities, the output is calculated back to a neutral format.

It is not visible in the output and transparent for the following processing steps how the labels for the disparities are then occupied. Transparent means here that the algorithms built upon the disparity map do not have to consider the non-uniform sampling.

DETAILED DESCRIPTION OF EXAMPLE EMBODIMENTS OF THE INVENTION

Figure 1:
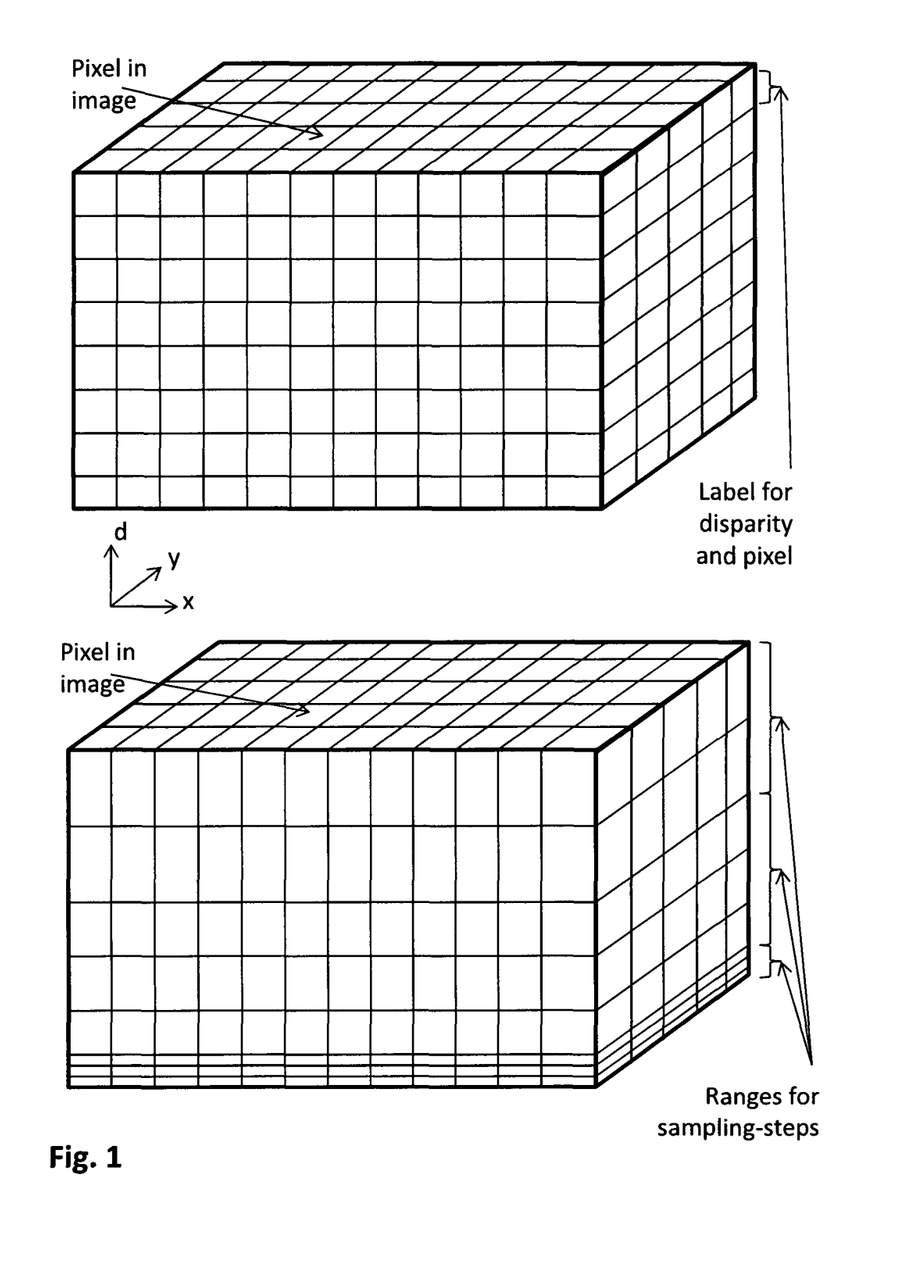
FIG. 1 shows an exemplary illustration of the cost volume and allocation of the labels. At the top: uniform sampling, bottom: non-uniform sampling according to the invention.

FIG. 1 shows as an example the allocation of the labels to the disparities in the cost volume. The xy-plane represents the pixel plane in the image. The d-axis corresponds to the disparity. Each voxel (volume element x-y-d) includes a cost value for a label. At the top, the uniform distribution of the label to the disparities is shown. At the bottom, the non-uniform distribution with three different sampling stages is shown.

Figure 2:
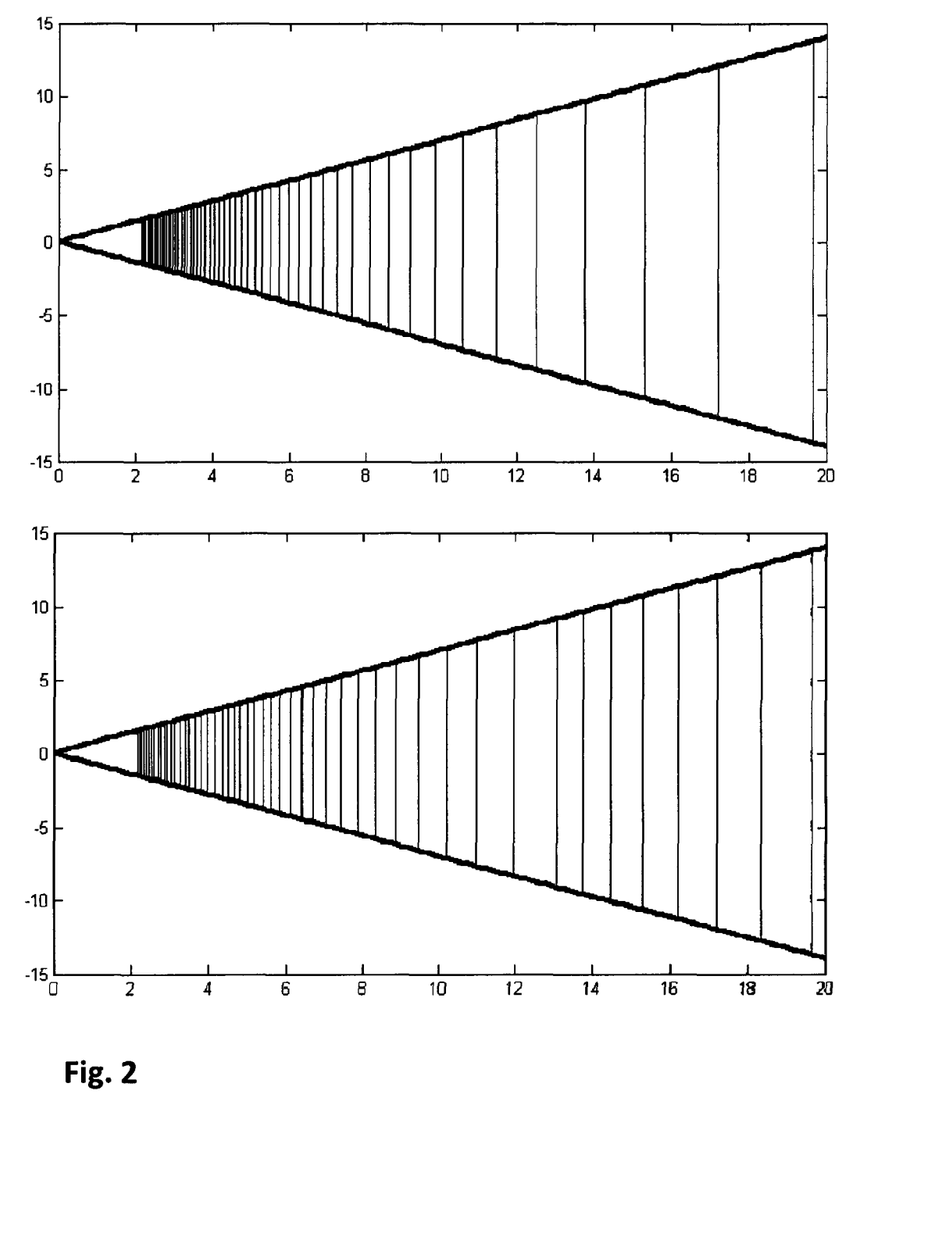
FIG. 2 shows distances, which correspond to disparities in the cost volume. At the top: uniform sampling, bottom: non-uniform sampling according to the invention.

FIG. 2 shows the distances for the disparity labels. On the abscissa the distance to the stereo camera is indicated. On the ordinate a direction perpendicular to the optical axis of the stereo camera is indicated. Thus, the limiting straight lines characterize the field of view of the stereo camera. The vertical lines correspond to individual predefined disparities. It can be seen that the depth measurement for non-uniform sampling (bottom) is resolved in more remote areas twice as precise.

Figure 3:
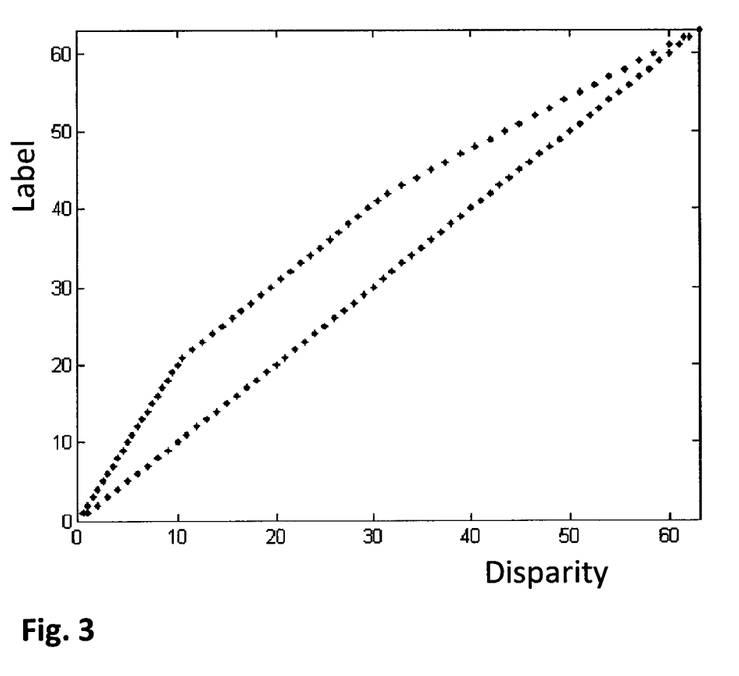
FIG. 3 shows the allocation of the labels to the disparities.

In FIG. 3 the allocation of the labels to the disparities for the given example is shown (comp. values in the table). The points, which form a diagonal line, apply to the uniform sampling, the points, which extend above the diagonal line, apply to the non-uniform sampling.

Figure 4:
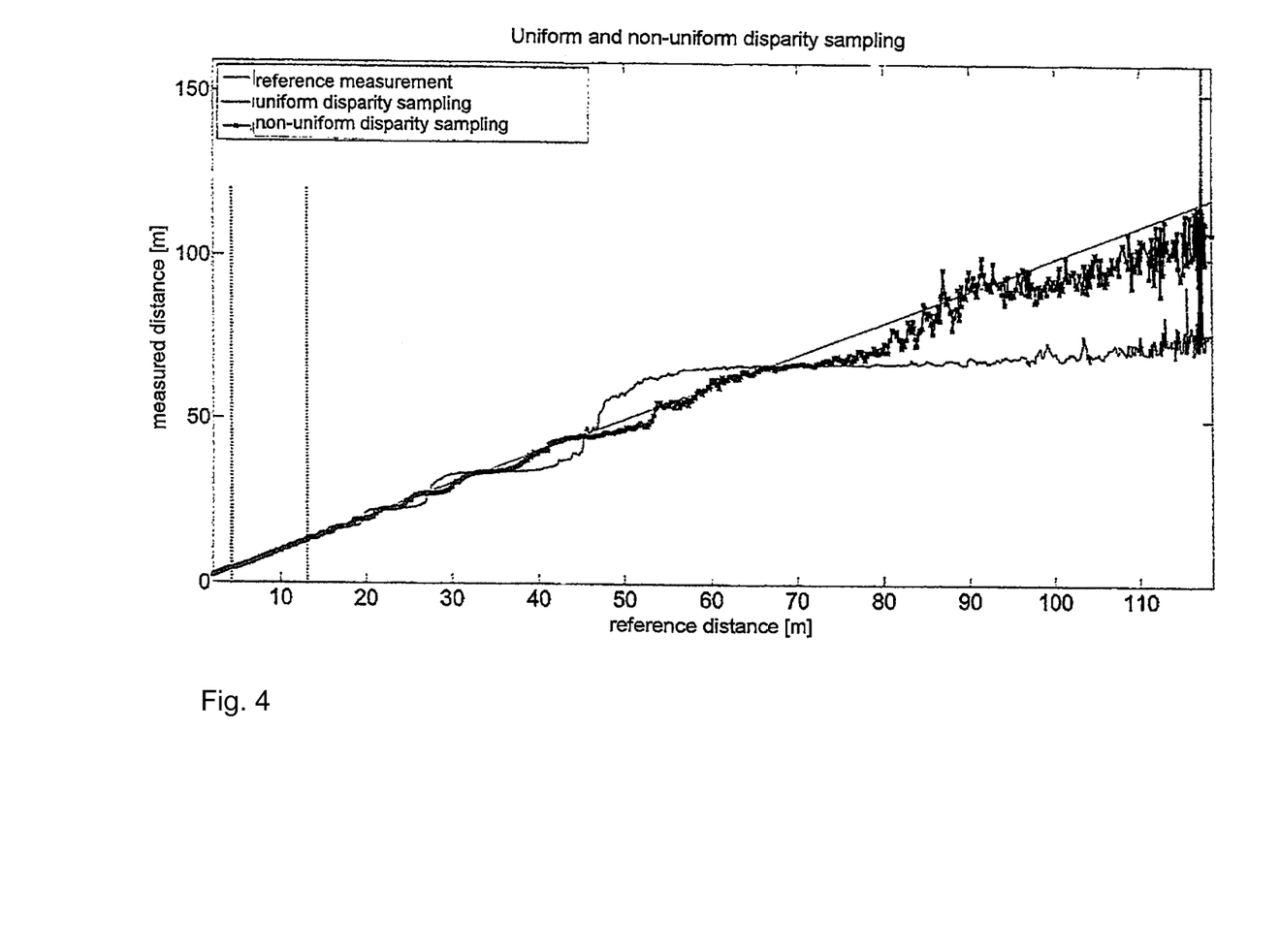
FIG. 4 shows the comparison measurement between uniform and non-uniform sampling.

FIG. 4 shows the results in real measurements. In the test a vehicle approached a target. The distance measured in meters is plotted above the reference distance (actual distance) in meters. The distance to the target was precisely determined with a reference sensor (solid line). The measured curves without highlighting the measured points indicate the measurements of SGM with uniform sampling. It can be seen that the distance determination in the range up to approx. 15 meters works without significant deviations. For longer distances, however, more and more deviations occur, wherein the measured curve typically comprises steps (approximately at 20 m, 27 m, 47 m and at 118 m). Before these steps, the measured distance is in each case shorter than the actual one and after the steps the measured distance is greater than the actual one. This is mainly caused by the fact that in the uniform sampling for long distances only a few pixels are significant for large distance differences. The measured curve with highlighting the measured points shows the measured values of the adapted SGM with non-uniform sampling as is described in the example. The deviations of these measurements are always lower than with the uniform sampling. The improvement in accuracy in the far range is clearly visible.

The method offers the advantage that only those disparities are calculated more precisely, for which a more precise determination is required. A double resolution in the far range results in a savings of nearly 50% of computing resources compared to an implementation with an all in all doubled resolution. With four times the resolution the savings are nearly 75%.

The invention claimed is:

1. A method for determining a depth map from a stereo image pair, wherein a disparity for a pixel is determined from a discrete quantity of predefined disparity values, the predefined disparity values are distributed over an entire predefined disparity value range in a distribution that has at least two different values of distances between respective adjacent disparity values among the predefined disparity values, and the distances between the respective adjacent disparity values are smaller in a far range and larger in a close range.

2. The method according to claim 1, wherein at least one of the distances has a length below a dimension of the pixel.

3. The method according to claim 2, wherein comparison/similarity costs for sub-pixel disparities are determined by interpolation from comparison/similarity costs of adjacent integer disparities, and the comparison/similarity costs of the adjacent integer disparities are determined by an appropriate comparison operator from the stereo image pair.

4. The method according to claim 1, wherein comparison/similarity costs for disparities in the stereo image pair are determined by a suitable comparison operator.

5. The method according to claim 1, wherein the distances between the respective adjacent disparity values are specified while taking account of effect caused by over- or sub-sampling.

6. The method according to claim 1, wherein the disparity is determined by a global or semi-global matching or correspondence method.

7. The method according to claim 6, wherein the disparity is further sub-pixel precisely refined by a minimum disparity based on comparison/similarity costs of the adjacent disparity values after the global or semi-global matching or correspondence method.

8. An apparatus for determining a depth map from a stereo image pair according to the method of claim 1, said apparatus comprising a stereo camera that is configured and adapted to record the stereo image pair, and a determination unit that is configured and adapted to evaluate the stereo image pair recorded by the stereo camera according to said method.

9. A method for determining a depth map from stereo images, wherein disparities are determined from at least one pair of stereo images, respective values are assigned to the disparities from a predetermined set of potential disparity values that are not uniformly distributed over an entire disparity value range of the potential disparity values, and a distance between two selected adjacent ones of the potential disparity values, in which disparities for a far range are determined, is smaller than a distance between two other adjacent ones of the potential disparity values.

10. An apparatus for determining a depth map from stereo images according to the method of claim 9, said apparatus comprising a stereo camera that is configured and adapted to record the stereo images, and a determination unit that is configured and adapted to evaluate the stereo images recorded by the stereo camera according to said method.

11. The method according to claim 9, wherein the far range is at least 10 meters away from a stereo camera with which the stereo images are recorded.

12. The method according to claim 9, wherein the two other adjacent ones of the potential disparity values are two adjacent disparity values in which disparities for a close range are determined.

13. The method according to claim 12, wherein the close range is a maximum of 5 meters away from a stereo camera with which the stereo images are recorded.

14. The method according to claim 9, wherein the disparities are determined by a global or semi-global matching or correspondence method.

15. The method according to claim 9, wherein at least one distance between two adjacent ones of the potential disparity values is smaller than a dimension of a pixel.

16. The method according to claim 9, wherein the distance between the two adjacent ones of the potential disparity values is specified while taking account of effects caused by over- or sub-sampling.

17. The method according to claim 9, wherein similarity costs for the disparities are determined.

18. The method according to claim 17, wherein the similarity costs of a selected one of the disparities are determined from the similarity costs of the disparities adjacent to the selected disparity.

19. The method according to claim 17, wherein the similarity costs of a selected one of the disparities are determined directly from the at least one pair of stereo images.

20. The method according to claim 19, wherein the disparities and the similarity costs thereof are determined only for the distances between two adjacent ones of the disparity values, which correspond to a dimension of one or more pixels.

21. A method for determining a depth map from a stereo image pair, wherein a disparity for a pixel is determined from a discrete quantity of predefined disparity values, the disparity values are distributed over an entire predefined disparity value range in a distribution that has at least two different values of distances between respective adjacent disparity values among the predefined disparity values, a reference image and a search image are produced from the stereo image pair, a resolution of the reference image is reduced by an integer factor k compared to a resolution of the search image, and the disparity is determined with an accuracy of 1/k pixels based on the reference image and the search image.

22. An apparatus for determining a depth map from a stereo image pair according to the method of claim 21, said apparatus comprising a stereo camera that is configured and adapted to record the stereo image pair, and a determination unit that is configured and adapted to evaluate the stereo image pair recorded by the stereo camera according to said method.

* * * * *